United States Patent
Allegretti

(10) Patent No.: US 9,631,604 B2
(45) Date of Patent: Apr. 25, 2017

(54) SYSTEM FOR PRODUCING ELECTRICAL ENERGY

(71) Applicant: SUNJADE INVESTMENT LTD, Greater London (GB)

(72) Inventor: Claudio Allegretti, Pavia (IT)

(73) Assignee: SUNJADE INVESTMENT LTD, Greater London (GB)

( * ) Notice: Subject to any disclaimer, the term of this patent is extended or adjusted under 35 U.S.C. 154(b) by 0 days.

(21) Appl. No.: 14/769,451

(22) PCT Filed: Feb. 25, 2014

(86) PCT No.: PCT/IB2014/059235
§ 371 (c)(1),
(2) Date: Aug. 20, 2015

(87) PCT Pub. No.: WO2014/128677
PCT Pub. Date: Aug. 28, 2014

(65) Prior Publication Data
US 2016/0003217 A1    Jan. 7, 2016

(30) Foreign Application Priority Data

Feb. 25, 2013   (IT) .............................. MI20130067 U

(51) Int. Cl.
*F03D 9/00*    (2016.01)
*F03D 3/04*    (2006.01)
(Continued)

(52) U.S. Cl.
CPC .............. *F03D 3/0427* (2013.01); *F03D 3/04* (2013.01); *F03D 3/067* (2013.01); *F03D 9/002* (2013.01);
(Continued)

(58) Field of Classification Search
CPC ....................................................... F03D 9/00
(Continued)

(56) References Cited

U.S. PATENT DOCUMENTS

| 5,300,817 A | 4/1994 | Baird |
| 6,201,313 B1 | 3/2001 | Nakamats |

(Continued)

FOREIGN PATENT DOCUMENTS

| FR | 2371585 A1 | 6/1978 |
| FR | 2531753 A1 | 2/1984 |

(Continued)

OTHER PUBLICATIONS

International Search Report dated Aug. 7, 2014.
English Abstract for FR 2531753 A1 dated Feb. 17, 1984.
English Abstract for FR 2371585 A1 dated Jun. 16, 1978.

*Primary Examiner* — Joseph Waks
(74) *Attorney, Agent, or Firm* — Hedman & Costigan, P.C.; James V. Costigan; Kathleen A. Costigan

(57) ABSTRACT

A system (10) for producing electrical energy, configured to be operatively connected to a machine for generating air flows (12), having a motor of an air conditioner. The system (10) also includes at least one wind turbine (14) and at least one air collector (16), arranged between the machine for generating air flows (12) and a wind turbine (14). The air collector (16) is configured to channel and constantly reinforce the air flow emitted by the machine for generating air flows (12) in order to improve the yield of the wind turbine (14).

11 Claims, 5 Drawing Sheets

(51) Int. Cl.
*F03G 6/04* (2006.01)
*F03D 3/06* (2006.01)
*F03D 13/20* (2016.01)

(52) U.S. Cl.
CPC ............ *F03D 9/003* (2013.01); *F03D 13/22* (2016.05); *F03G 6/045* (2013.01); *F05B 2240/214* (2013.01); *Y02E 10/465* (2013.01); *Y02E 10/74* (2013.01)

(58) Field of Classification Search
USPC .......................................................... 290/55
See application file for complete search history.

(56) References Cited

U.S. PATENT DOCUMENTS

| | | | | |
|---|---|---|---|---|
| 7,208,846 B2 * | 4/2007 | Liang | ........................ | F03D 9/00 290/1 R |
| 7,538,447 B1 * | 5/2009 | Berenda | .................... | F03D 1/04 290/55 |
| 7,999,407 B2 * | 8/2011 | Saluccio | ................... | F03D 9/00 290/43 |
| 8,183,709 B1 * | 5/2012 | Manning | .................. | F03D 9/00 290/54 |
| 2002/0162329 A1 | 11/2002 | Dunn | | |
| 2008/0181771 A1 | 7/2008 | Papp | | |
| 2009/0212570 A1 | 8/2009 | Le | | |
| 2011/0089701 A1 * | 4/2011 | Blake | ...................... | F03D 3/002 290/55 |
| 2011/0173980 A1 | 7/2011 | Yangpichit | | |
| 2012/0038162 A1 * | 2/2012 | Smith, Jr. | ............... | F03D 9/002 290/52 |
| 2012/0068466 A1 * | 3/2012 | Gilbert | ...................... | F03D 1/04 290/55 |
| 2014/0356167 A1 * | 12/2014 | Schuler | ................... | F01D 15/10 416/91 |

FOREIGN PATENT DOCUMENTS

| | | | |
|---|---|---|---|
| JP | 2002054553 A | * | 2/2002 |
| JP | 2005016452 A | * | 1/2005 |

* cited by examiner

SYSTEM FOR PRODUCING ELECTRICAL ENERGY

The present invention refers in general to a system for producing electrical energy and, more specifically, to a system capable of converting the kinetic energy produced by a machine for generating air flows, like for example the motor of an air conditioner, into electrical energy.

As known, an air conditioner is a machine capable of developing sensible heat (positive or negative) that is exchanged with a fluid. The fluid, in turn put in circulation, yields such heat to a room in order to raise or lower its temperature.

An air conditioner typically comprises a compressor having the purpose of increasing the pressure of the fluid, which is in the gaseous state inside the compressor itself. Increasing the pressure of a gas also increases its temperature, so that the gas at the outlet of the compressor has a higher temperature and pressure with respect to those of the gas itself at the entry of the compressor.

The compressor of an air conditioner is usually in an external unit, commonly called motor, placed outside the room where it is wished to lower or raise the temperature. The motor is generally provided with one or more fans capable of promoting the yielding to the air of the heat generated by the compressions of the gas. In other words, the most common motors of air conditioners, usually positioned outside of buildings for civil or industrial use, generate substantial air flows, normally hot, the kinetic energy of which is completely dispersed into the environment.

The general purpose of the present invention is therefore to make a system for producing electrical energy, in particular a system capable of converting the kinetic energy produced by a machine for generating air flows into electrical energy, which is able to solve the aforementioned drawback of the prior art in an extremely simple, cost-effective and particularly functional manner.

In detail, a purpose of the present invention is to make a system for producing electrical energy that is able to recover the kinetic energy produced by a machine for generating air flows, like for example the motor of an air conditioner.

Another purpose of the invention is to make a system for producing electrical energy that is able to improve the yield of civil and industrial conditioning systems, recovering at least part of the electrical energy necessary for the systems themselves to operate.

These purposes according to the present invention are accomplished by making a system for producing electrical energy, in particular a system capable of converting the kinetic energy produced by a machine for generating air flows into electrical energy, as outlined in claim 1.

Further characteristics of the invention are highlighted by the dependent claims, which are an integral part of the present description.

The characteristics and advantages of a system for producing electrical energy according to the present invention will become clearer from the following description, given as an example and not for limiting purposes, referring to the attached schematic drawings, in which.

Figure 1:
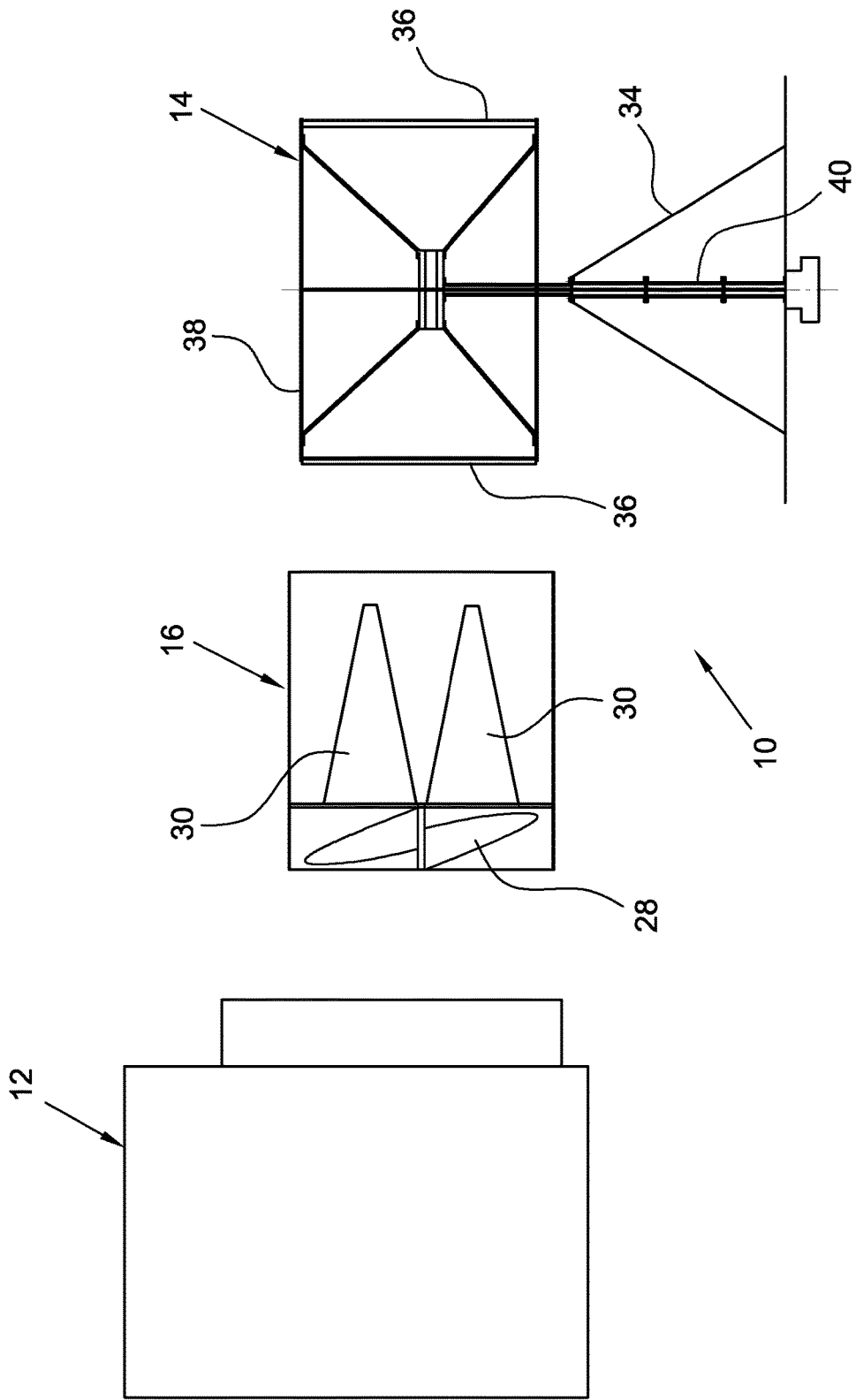
FIG. 1 is a schematic view that illustrates the main components of the system for producing electrical energy according to the present invention, applied at a generic motor of an air conditioner.
Figure 3:
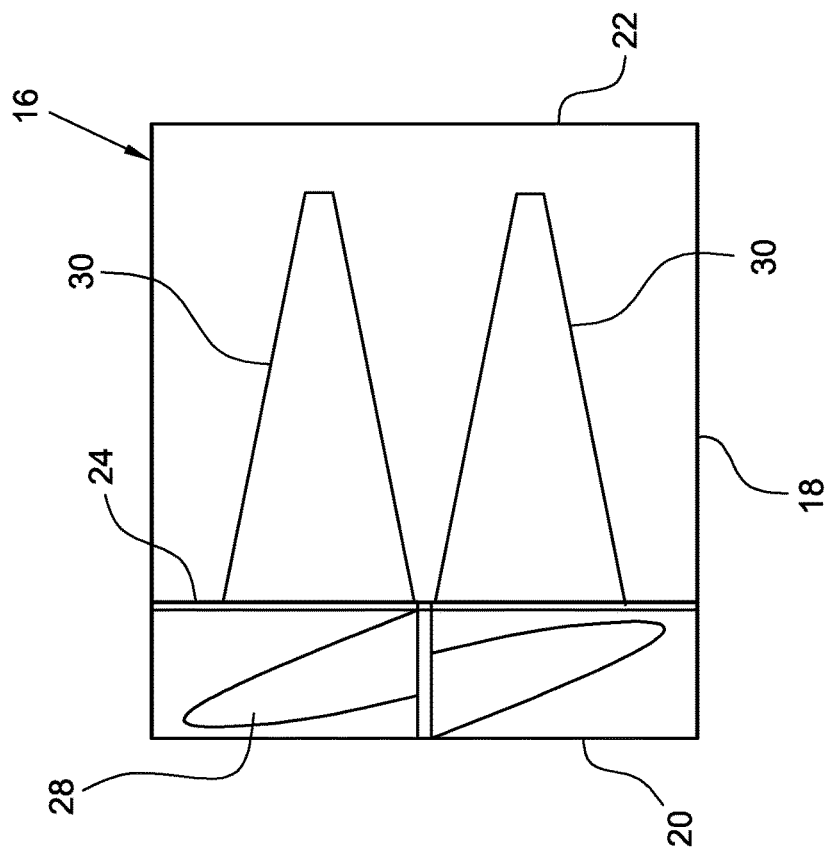
FIG. 3 is a section view, obtained along the line III-III of FIG. 2, of the component of FIG. 2.
Figure 2:
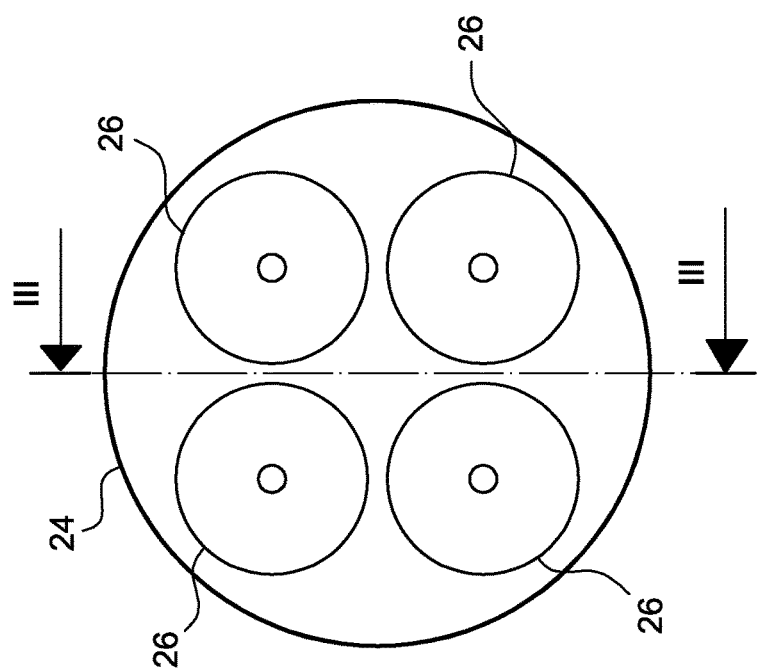
FIG. 2 is a rear side view of a first component of the system for producing electrical energy according to the present invention.
Figure 4:
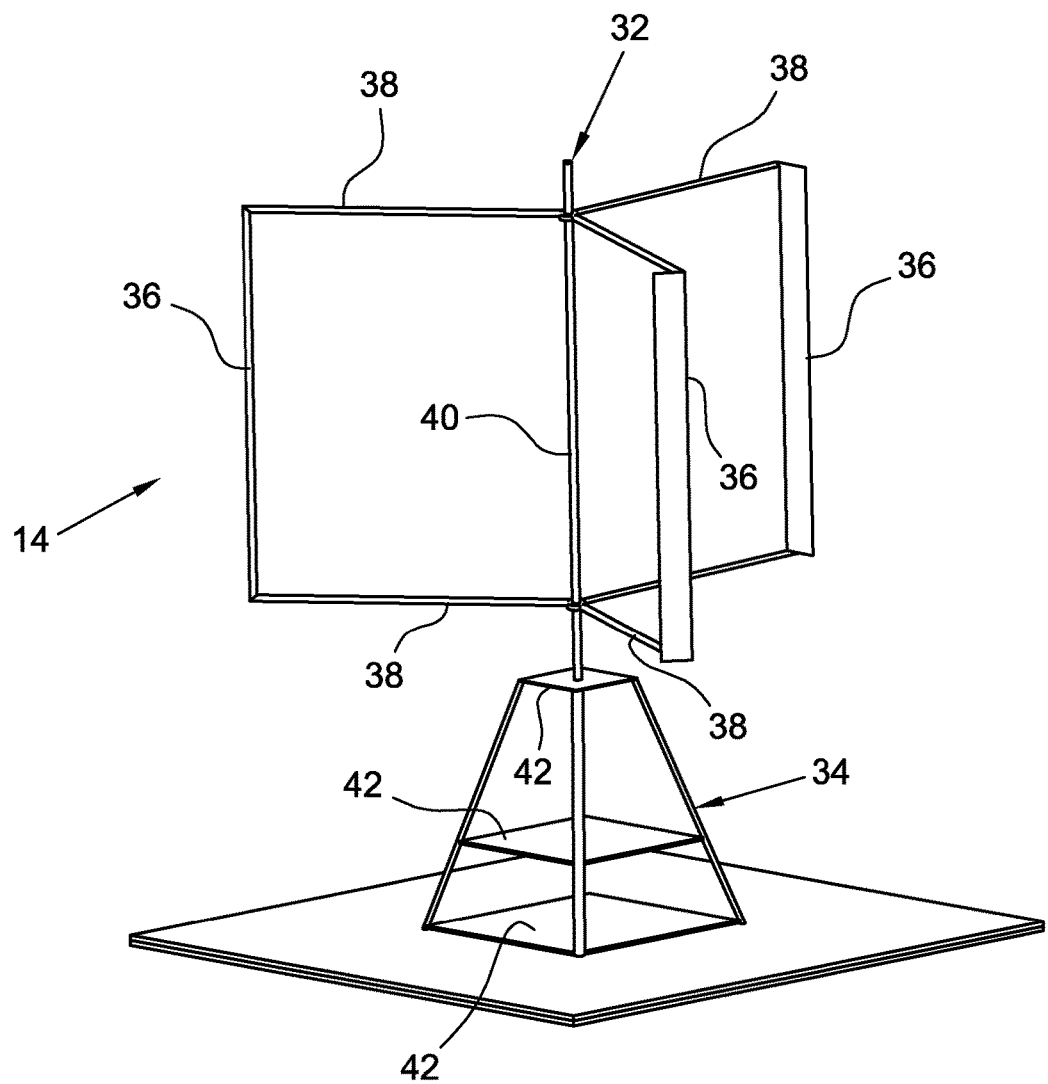
FIG. 4 is a perspective view of a second component of the system for producing electrical energy according to the present invention.

With reference to the figures, a preferred example embodiment of the system for producing electrical energy according to the present invention is shown, wholly indicated with reference numeral 10. The system 10 is configured to be operatively connected to a generic machine for generating air flows 12, consisting in particular but not exclusively of the motor of an air conditioner.

The system 10 comprises at least one wind turbine 14, with axis 40 extending preferably vertically, and at least one air collector 16, arranged between the machine for generating air flows 12 and such a wind turbine 14. The air collector 16 is configured to channel and constantly reinforce the air flow emitted by the machine for generating air flows 12 in order to improve the yield of the wind turbine 14.

Based on the example embodiment shown in the figures, the air collector 16 is provided with an outer casing 18 preferably made from carbon steel. The outer casing 18 is divided into an air inlet duct 20, facing towards the machine for generating air flows 12, and an air outlet duct 22, facing towards the wind turbine 14. The air inlet and outlet ducts 20, 22 are separated by a separating wall 24 provided with a plurality of through holes 26 for the air, preferably circular in shape.

Inside the air inlet duct 20 there is at least one idle fan 28, in other words not provided with its own actuation means. The fan 28 is equipped with a rotation axis preferably parallel to the direction of the air flow emitted by the machine for generating air flows 12 and entering into the air collector 16. The fan 28 is set in rotation by the air flow emitted by the machine for generating air flows 12 and operates to capture and convey such an air flow towards the wind turbine 14.

On the separating wall 24, at each through hole 26 for the air, there is a corresponding convergent conical tube 30 capable of increasing the speed of the air flow emitted by the machine for generating air flows 12 as its passage section progressively decreases. The air collector 16 is thus provided with four convergent conical tubes 30, one for each through hole 26 for the air, preferably having an initial diameter of the passage section equal to 140 mm and a final diameter of the passage section equal to 20 mm.

The wind turbine 14 is provided with at least one rotor 32 rotatably coupled with a base block 34. The rotor 32 comprises a plurality of blades 36 extending substantially vertically. The vertical shaft or rod 40 of the rotor 32 is able to give a high operating radius to the wind turbine 14, a low "cut in" level (moment at which the turbine starts to produce energy) and a high wind limit state for very high speeds. Moreover, the low impedance of the blades 36 extending substantially vertically generates low noise pollution and therefore promotes residential home installation of the system 10 according to the invention.

In the base block 34 an integrated electrical system is installed that is capable of converting the kinetic energy produced by the rotation of the rotor 32 into electrical energy, as well as of directly inputting such electrical energy into the power grid. In detail, as will be specified more clearly hereafter, the electrical system comprises an alternator, a charge transformer 50, an inverter 52 and one or more operating batteries 54. The lower part of the base block 34 houses a ballast and one or more fastening and sustaining systems of the wind turbine 14 with respect to a generic support surface, like for example the ground.

Preferably, the wind turbine 14 is able to start up automatically exploiting the air flow emitted by the machine for generating air flows 12. In order to allow household use of the wind turbine 14, the blades 36 have a preferred height of 1.5 m and are preferably positioned about 2.5 m from its rotation shaft 40 through the interposition of relative substantially horizontal arms 38. The wind turbine 14 is thus preferably designed for producing electrical energy with a power of 2000 W in full working order, with a speed of the air flow of 12 m/s.

The base block 34 is advantageously shaped like a frustum of pyramid and is made up of a plurality of plates 42 and of beams for supporting the rotor 32 and for containing the electrical system. The plates 42 extend substantially horizontally and are provided with through holes for housing bearings that surround the shaft 40 and facilitate its rotation. The presence of the bearings also minimises the starting torque of the rotor 32, so that the wind turbine 14 can start up automatically and with ease exploiting just the air flow emitted by the machine for generating air flows 12.

Figure 5B:
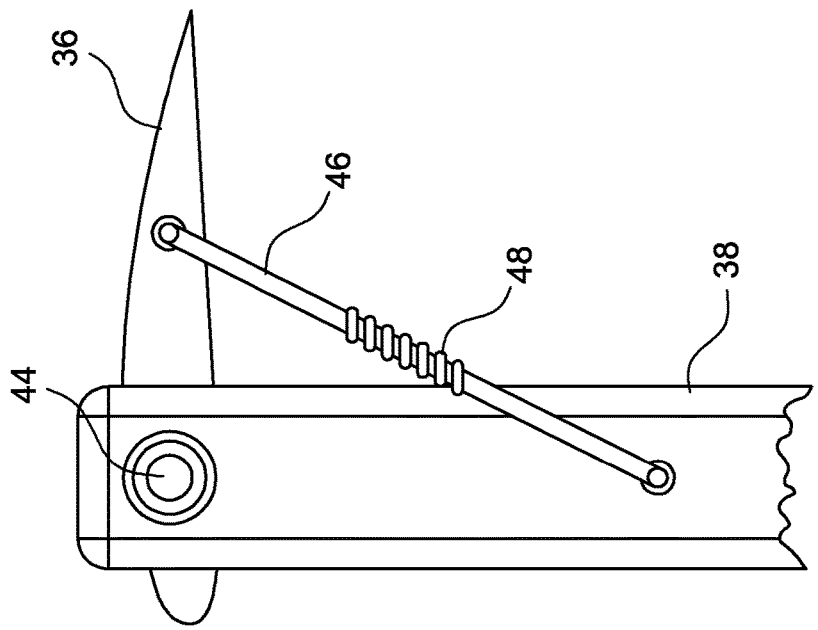
FIGS. 5A and 5B are two top plan views that respectively show two possible configurations of the blades of the component of FIG. 4.
Figure 5A:
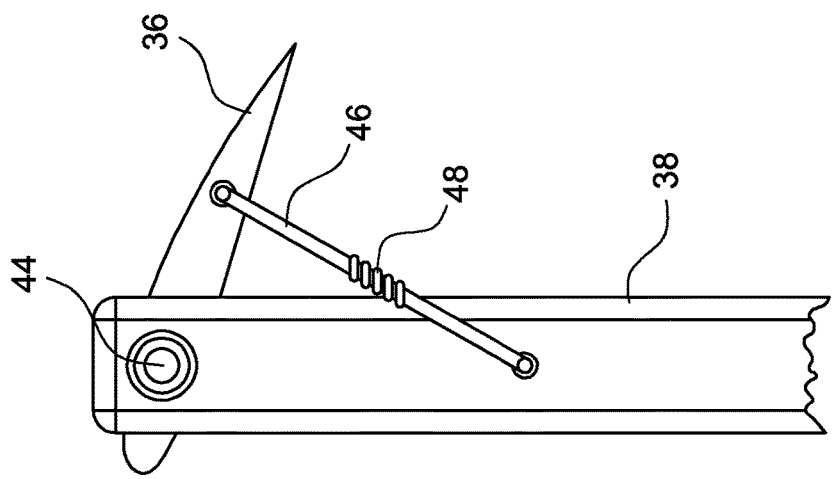
Figure 6:
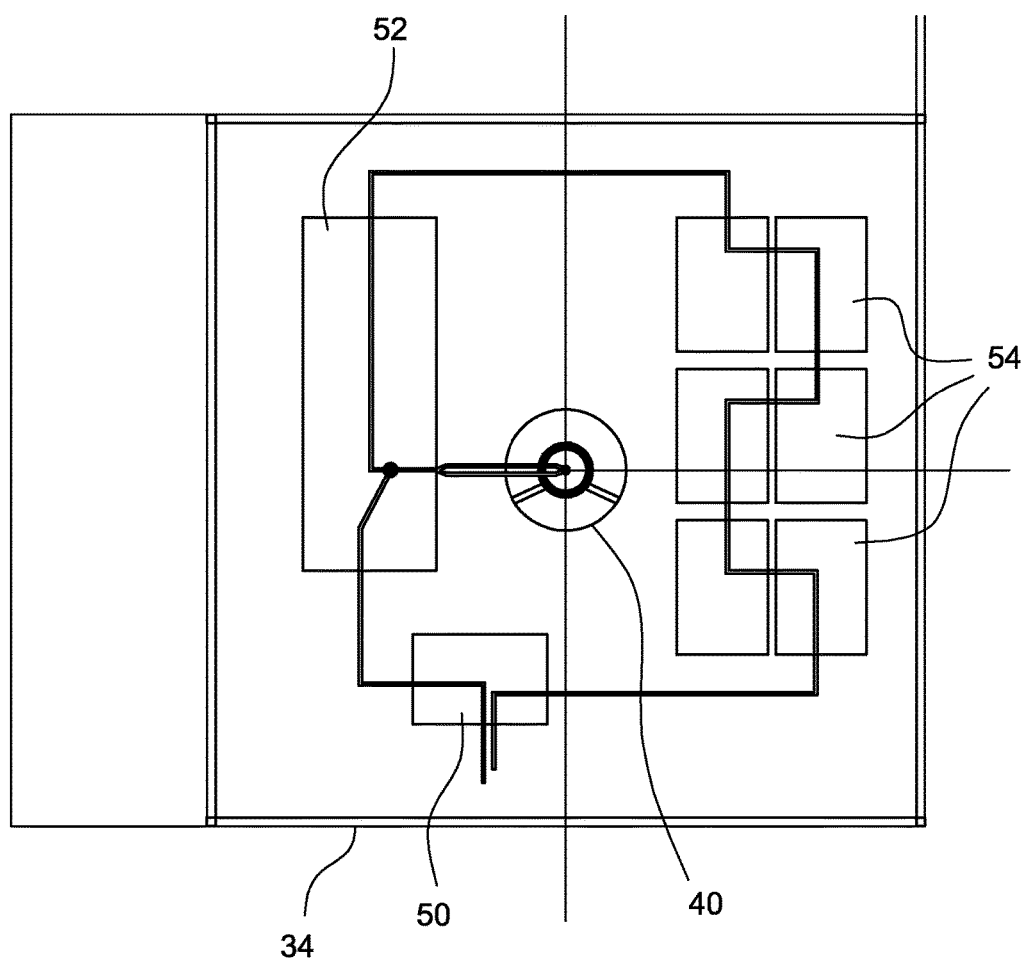
FIG. 6 shows the arrangement of the electric system of the component of FIG. 4.

The wind turbine 14 is preferably provided with an inclination device of the blades 36. The variation in inclination of the blades 36 is devised to improve the performance of the wind turbine 14 and to promote autonomous starting. As shown in FIGS. 5A and 5B, the inclination device of the blades 36 foresees for each blade 36 to be rotatably connected to the relative arms 38 through pins 44 extending substantially vertically and is thus able to rotate about a substantially vertical axis.

The inclination device of the blades 36 comprises a connection rod 46 between each blade 36 and the relative arm 38. The rod 46 is provided with a spring 48 that, when the rotor 32 is immobile, keeps the relative blade 36 inclined according to a substantially acute angle with respect to the direction of extension of the relative arm 38 (FIG. 5A). When the rotor 32 is set in rotation, the centrifugal forces that are generated during such rotation allow the blade 36 to rotate outwards, putting the spring 48 under traction, until a substantially right angle is obtained between each blade 36 and the direction of extension of the relative arm 38.

As far as the electrical system of the wind turbine 14 is concerned, the alternator is preferably of the type using permanent magnets, whereas the inverter 52 is preferably of the sinusoidal type, so as to be able to generate an alternating current in output with a pure sinusoidal wave, suitable for being able to be inserted in parallel into a household electrical system. The electrical system of the wind turbine 14 can optionally be provided with an electrical board for monitoring the electrical energy produced by the wind turbine 14 itself, as well as with an automatic data acquisition device, or "datalogger", operatively connected to a microprocessor device, like for example a personal computer, for calculating the flow of electrical energy input into the power grid and for checking the power (in watts) actually produced.

It has thus been seen that the system for producing electrical energy according to the present invention achieves the purposes outlined earlier.

The system for producing electrical energy thus conceived can in any case undergo numerous modifications and variants, all of which are covered by the same innovative concept; moreover, all of the details can be replaced by technically equivalent elements. In practice, the materials used, as well as the shapes and sizes, can be whatever according to the technical requirements.

The scope of protection of the invention is therefore defined by the attached claims.

The invention claimed is:

1. System (10) for producing electrical energy, configured to be operatively connected to a machine for generating air flows (12), comprising a motor of an air conditioner, the system (10) being characterised in that it comprises at least one wind turbine (14) and at least one air collector (16), arranged between the machine for generating air flows (12) and said wind turbine (14), wherein the air collector (16) is configured to channel and constantly reinforce the air flow emitted by the machine for generating air flows (12) in order to improve the yield of the wind turbine (14) wherein the air collector (16) is provided with an outer casing (18) divided into an air inlet duct (20), facing towards the machine for generating air flows (12), and an air outlet duct (22), facing towards the wind turbine (14), in which an air inlet duct (20) and an air outlet duct (22) are separated by a separating wall (24) provided with a plurality of through holes (26) for air flow emitted by the machine for generating air flows (12) and wherein inside the air inlet duct (20) there is at least one idle fan (28), that is not provided with its own actuation means, said at least one idle fan (28) being set in rotation by the air flow emitted by the machine for generating air flows (12) and operating to capture and convey said air flow emitted by the machine for emitting air flows towards the wind turbine (14).

2. System (10) according to claim 1, characterised in that on the separating wall (24), at each through hole (26) for the air, there is a corresponding convergent conical tube (30) capable of increasing the speed of the air flow emitted by the machine for generating air flows (12) as its passage section progressively decreases.

3. System (10) according to claim 1, characterised in that the wind turbine (14) is provided with at least one rotor (32) rotatably coupled with a base block (34), wherein the rotor (32) comprises a plurality of blades (36) extending substantially vertically and a rotation shaft or rod (40), also extending substantially vertically.

4. System (10) according to claim 3, characterised in that the base block (34) is shaped like a frustum of a pyramid and is made up of a plurality or plates (42) and of beams for supporting the rotor (32) and for containing the electric system, wherein the plates (42) extend substantially horizontally and are provided with through holes for housing bearings that surround the rotation shaft or rod shaft (40) and Facilitate rotation of said rotation shaft or rod (40), the presence of the housing bearings also minimising the starting torque for the rotor (32), so that the wind turbine (14) can start automatically and with ease exploiting just the air flow emitted by the machine for generating air flows (12).

5. System (10) according to claim 4, characterised in that a wind turbine (14) electrical system comprises an alternator, a charge transformer (50), an inverter (52) and one or more operating batteries (54).

6. System (10) according to claim 5, characterised in that the inverter (52) is of the sinusoidal type, so as to be able to generate an alternating current in output with a pure sinusoidal wave, suitable for being able to be inserted in parallel in a household electrical system.

7. System (10) according to claim 5, characterised in that the electrical system of the wind turbine (14) also comprises an electrical board for monitoring the electrical energy produced by said wind turbine (14), as well as an automatic data acquisition device, operatively connected to a microprocessor device, for calculating a flow of electrical energy input into a power grid and for checking power produced.

8. System (10) according to claim 3, characterised in that the lower part of the base block (34) houses a ballast and one or more fastening and sustaining systems of the wind turbine (14) with respect to a support surface.

9. System (10) according to claim 3, characterised in that the blades (36) are positioned at a predetermined distance from the rotation shaft (40) through the interposition of relative substantially horizontal arms (38).

10. System (10) according to claim 9, characterised in that the blades (36) are provided with an inclination device that rotatably connects each blade (36) to the relative substantially horizontal arms (38) through pins (44), whereby said blades extend substantially vertically and are able to rotate about a substantially vertical axis.

11. System (10) according to claim 10, characterised in that the inclination device of the blades (36) comprises a connection rod (46) between each blade (36) and the relative substantially horizontal arm (38), said connection rod (46) being provided with a spring (48) that, when the rotor (32) is immobile, keeps the blade (36) inclined according to a substantially acute angle with respect to the direction of extension of the relative substantially horizontal arm (38), whereas when the rotor (32) is set in rotation the centrifugal forces that are generated during said rotation allow the blade (36) to rotate outwards, placing the spring (48) under traction, until a substantially right angle is obtained between said blade (36) and the direction of extension of the relative substantially horizontal arm (38).

\* \* \* \* \*